US008560116B2

(12) United States Patent
Ojdemark

(10) Patent No.: US 8,560,116 B2
(45) Date of Patent: Oct. 15, 2013

(54) WASTE FRACTION MANAGEMENT

(75) Inventor: Christer Ojdemark, Linkoping (SE)

(73) Assignee: Envac AB, Stockholm (SE)

( * ) Notice: Subject to any disclaimer, the term of this patent is extended or adjusted under 35 U.S.C. 154(b) by 179 days.

(21) Appl. No.: 13/144,844

(22) PCT Filed: Jan. 16, 2009

(86) PCT No.: PCT/SE2009/050034
§ 371 (c)(1),
(2), (4) Date: Jul. 15, 2011

(87) PCT Pub. No.: WO2010/082878
PCT Pub. Date: Jul. 22, 2010

(65) Prior Publication Data
US 2011/0282486 A1 Nov. 17, 2011

(51) Int. Cl.
*G06F 7/00* (2006.01)
*B07C 1/00* (2006.01)

(52) U.S. Cl.
USPC ........... 700/225; 700/213; 700/216; 700/219; 700/223; 700/228; 700/230; 700/231; 209/655

(58) Field of Classification Search
None
See application file for complete search history.

(56) References Cited

U.S. PATENT DOCUMENTS 5,190,165 A * 3/1993 Garfield, Jr. .................. 209/655

FOREIGN PATENT DOCUMENTS

| | | | |
|---|---|---|---|
| CN | 1847110 | A | 10/2006 |
| DE | 10304263 | A1 | 8/2004 |
| FR | 2 900 138 | A1 | 10/2007 |
| JP | 2002245159 | A | 8/2002 |
| WO | 2005118435 | A1 | 12/2005 |

OTHER PUBLICATIONS

International Search Report dated, Oct. 5, 2009, from corresponding PCT application.
Extended European Search Report, dated Feb. 18, 2013, from corresponding PCT application.
Chinese Office Action, dated Feb. 25, 2013, from corresponding CN application.

* cited by examiner

*Primary Examiner* — Yolanda Jones
(74) *Attorney, Agent, or Firm* — Young & Thompson

(57) ABSTRACT

In a method for managing waste (W) deposited in disposal packages (6-$F_1$, 6-$F_2$, 6-F . . . 6-$F_n$) and introduced into a vacuum operated waste collection system (1) wherein waste is conveyed through transport piping (3), from waste inlets (2) to a waste collection container (5) for storing waste before removal and wherein the disposal packages carry readable information (7-$F_1$, 7-$F_2$, 7-$F_3$ . . . 7-$F_n$), disposal packages containing one of multiple waste fractions ($F_1$, $F_2$, F . . . $F_n$) are received through a common waste inlet, subsequent to identifying each disposal package by comparing read waste fraction information carried thereby and being unique for each fraction, with stored fraction data, comparing the identified disposal packages to a fraction time schedule for matching package information to fraction time schedule time periods belonging to the respective fraction, whereby access to the waste inlet is allowed for each package during the time periods belonging thereto and is blocked for each package at all other times.

17 Claims, 11 Drawing Sheets

WASTE FRACTION MANAGEMENT

TECHNICAL FIELD

The present invention generally concerns vacuum operated waste collection systems and specifically relates to the collection and handling of multiple waste fractions in such systems.

BACKGROUND

Conservation of resources and general environmental issues take an increasing place in today's societies. In view thereof governments as well as the waste management industry focus more and more on the separation of waste in multiple fractions and on the recycling of such fractions. Early waste recycling attempts have clearly established that rational and cost effective separation of waste in fractions must be done "at the source". The separation of "mixed" waste afterwards, from a common receptacle, would be far too expensive and/or technically complex. Therefore, it has been common to provide separate containers for the largest fractions, such as aluminum cans, glass, paper and plastic/paper packages. Such separate fraction containers are becoming more and more frequent, not only at city dumps but also in residential areas, office areas and hospitals.

The above described source separation attempts in residential areas all involve considerable transport problems, both with regard to the users that are required to carry the separated fractions to the containers and with regard to the transportation of the containers for the separate fractions to a community dump, to a recycling plant or other locations. For vacuum operated waste collection systems it has also been suggested to use waste inlets and transport piping for separate collection of bulkier fractions such as newspaper or glass. With the existing technique such waste separation has mainly been implemented by using separate waste chutes or waste inlets associated with separated temporary storage facilities. Such techniques require much additional construction work for separate waste chutes or additional excavation work for separate free-standing waste inlets.

The described drawbacks and inconveniences become even more pronounced for the "smaller" waste fractions that in the household waste environment may include batteries, electronic waste, metal etc. and that in other environments, such as hospitals, may include hazardous and/or toxic waste. Particular problems arise for such waste, not only because the fractions are so comparatively small that it is not economically acceptable to invest in separate inlets for the different fractions, but also because of the sometimes absolute requirement that such fractions must not be mixed in any part of the handling sequence.

SUMMARY

There is a general need for solutions enabling rational collection and handling of waste fractions. A general object of the present invention is therefore to find a solution for overcoming the above discussed problems and disadvantages of conventional waste fraction management.

A particular object of the invention is to suggest an improved method of cost efficient handling of multiple deposited waste fractions.

Another object of the invention is to suggest a vacuum operated waste collection system that will enable cost efficient and secure waste fraction management.

Yet another object of the invention is to suggest a control unit for controlling a vacuum operated waste collection system so as to enable cost efficient and secure waste fraction management.

A further object of the invention is to suggest an improved waste inlet enabling comfortable, safe and efficient deposit of waste.

These and other objects are met by the invention as defined by the accompanying patent claims.

The invention relates to the collection and management of waste that is deposited in waste disposal packages and that is received in a vacuum operated waste collection system. Waste is intermittently conveyed in the system, from at least one waste inlet through waste transport piping and to a waste collection container where it is stored before removal. The waste disposal packages carry information readable by information reading means. In order to improve the cost efficiency and security of the management of waste fractions, a basic idea of the invention is to provide a waste handling method wherein waste disposal packages that each contain only one of multiple waste fractions are received through a common waste inlet. To secure that fractions are not mixed with each other it is suggested that each received waste disposal package is first identified with regard to the fraction deposited therein. This is done by comparing read waste fraction information carried by each disposal package and being unique for each fraction, with stored waste fraction data. Then the identified waste disposal packages are compared with a preset fraction time schedule for matching the waste fraction information of the packages to predetermined fraction time schedule time periods that belong to the respective fraction. Access to an inlet opening of the waste inlet is allowed for each identified package during the predetermined fraction time schedule time periods that belong to the respective fraction, and access to the waste inlet is blocked for each identified package at all other times. In this way, waste fractions may only be received in the system during their preset time period. This is a clear improvement since it allows for a very efficient use of a relatively small number of waste inlets and only one waste collection container for collecting multiple waste fractions in a system. Additionally, this improvement contributes to lowering the investment costs and the need for excavation work for vacuum operated waste collection systems.

In an embodiment of this aspect of the invention an optionally selectable, preset fraction time schedule is set up for allowing access to a waste inlet opening for the individual waste fractions during specified hours of each day, during specified days of each week or during specified weeks of each month. In this way a very flexible fraction collection method may be created, that may easily be altered in accordance with changing conditions.

In accordance with another aspect of the invention an improved system for vacuum operated collecting and managing of waste is suggested. The system has at least one waste inlet for receiving waste deposited in waste disposal packages and waste transport piping for conveying the packages from the inlets to a waste collection container that serves to temporarily store waste before its removal. The waste disposal packages carry readable information and information reading means are provided at the inlet or inlets. A basic idea of the invention is that said at least one waste inlet is common for all disposal packages that each contain only one of multiple waste fractions. The system further comprises means for receiving waste fraction identifying information of each disposal package containing one of the multiple waste fractions, said identifying information being unique for each of the multiple fractions; means for identifying each waste disposal package to be received by comparing waste fraction information carried thereby with stored waste fraction data, and means for comparing the identified waste disposal packages with a preset fraction time schedule for matching the waste fraction information of the packages to predetermined fraction time schedule time periods that belong to the respective fraction. Means are also provided for controlling release and activation of an inlet door lock, allowing access to a waste inlet opening only during the predetermined fraction time schedule time periods that belong to the respective fraction and blocking access to the waste inlet for each identified package at all other times. The system of the invention provides excellent conditions for performing secure and effective waste fraction collection In accordance with yet another aspect of the invention an improved control unit is suggested for a system for vacuum operated collecting and managing of waste. The system has at least one waste inlet for receiving waste deposited in waste disposal packages and waste transport piping for conveying the packages from the inlets to a waste collection container for temporarily storing waste before removal. The waste disposal packages carry readable information and information reading means are provided at the inlet/inlets of the system. Basically, the invention provides a control unit having means for receiving waste fraction identifying information of each disposal package containing one of multiple waste fractions. The identifying information is unique for each of the multiple fractions. The control unit further comprises means for identifying each waste disposal package by comparing waste fraction information carried thereby with stored waste fraction data. Means are further provided for comparing the identified waste disposal packages with a preset fraction time schedule for matching the waste fraction information of the packages to predetermined fraction time schedule time periods that belong to the respective fraction. The control unit also comprises means for controlling release and activation of an inlet door lock blocking and allowing, respectively, access to a waste inlet opening through an inlet door.

In accordance with a further aspect of the invention an improved waste inlet for use in a vacuum operated waste collection system is suggested. The waste inlet is intended for use in a system having at least one waste inlet for the introduction of waste deposited in waste disposal packages and waste transport piping for conveying the packages from the inlets to a waste collection container for temporarily storing waste before removal. Such a waste inlet comprises a housing including an inlet door disposed on the front to input waste there through, a recognition system, an overground chute and an underground chute formed in the housing to temporarily store the waste, and a discharge valve formed at an end of the underground chute to discharge the waste to the conveyance piping. In a basic idea of the invention the waste inlet has lighting board means for displaying an operational state of the inlet door to a user, a door opening and closing operation sensor provided in the inlet door to detect opening and closing of the inlet door, an input assisting plate contacting an inside of the inlet door and having a cylindrical plate form slantly extended into the overground chute. A chute level sensor is provided, detecting a waste level in the chutes to perform an interlock function and a valve opening and closing operation sensor is provided for detecting opening and closing of the discharge valve to perform the interlock function. A supervisory operational board receives signals generated from the respective sensors and accordingly controls operations of the waste inlet, whereby the opening and closing operation of the inlet door is performed by a pneumatic cylinder. With such an inlet very user friendly, secure and effective waste collection may be performed.

Preferred further developments of the basic inventive idea as well as embodiments thereof are specified in the dependent subclaims.

Advantages offered by the present invention, in addition to those described above, will be readily appreciated when reading the below detailed description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
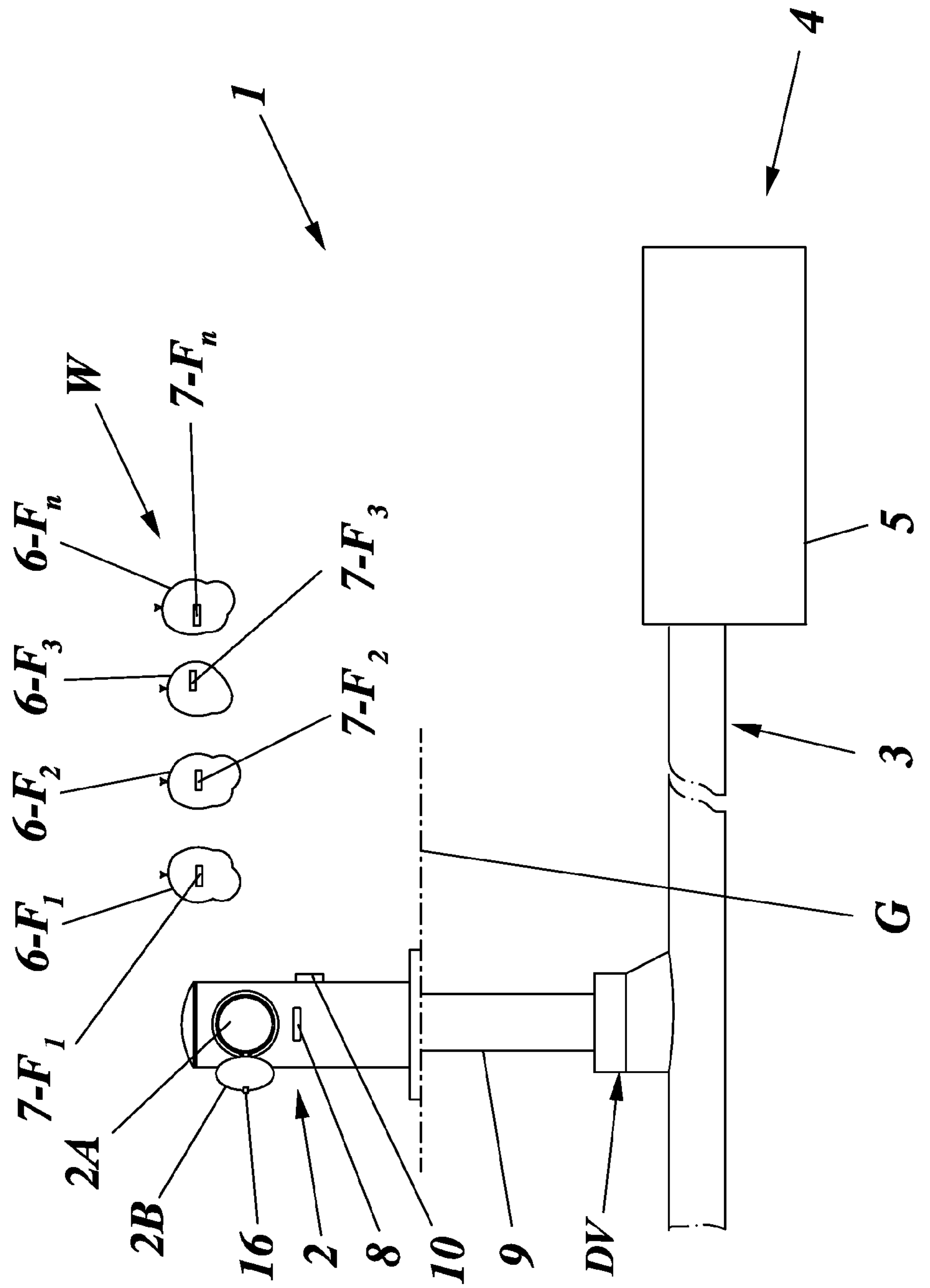
FIG. 1 is a schematical illustration of an exemplary first embodiment of a vacuum waste collection system according to the invention.

The invention will be explained below with reference to exemplifying embodiments and applications of a vacuum operated waste collection and management system of the invention, which are illustrated in the accompanying drawing figures. A first embodiment of a waste collection system of the invention is illustrated in FIGS. 1-4, and relates to an application of the inventive solution to a partially and schematically outlined stationary-type vacuum waste collection system having a central collection terminal. A second embodiment of a waste collection system of the invention is illustrated very schematically in FIG. 5 and relates to an application of the inventive solution to a partially and schematically outlined mobile-type vacuum waste collection system. It shall be emphasized, though, that the illustrations are for the purpose of describing preferred embodiments of the invention and are not intended to limit the invention to the details thereof. The terms "waste" and "waste fraction" as used throughout the specification shall comprise any kind of waste that is suitable for collection in a vacuum operated waste collection and handling system. Although the invention will be exemplified herein in systems specifically intended for handling waste fractions produced in households, offices or hospitals the invention shall therefore not be restricted thereby.

As was mentioned briefly in the introduction, present day waste fraction handling normally involves separate deposit and storage of the different fractions in designated, separate containers. Conventionally, larger recyclable waste fractions, such as paper/newspapers, may in stationary vacuum systems be collected through the existing waste disposal chutes in a building. The separated and sorted waste fractions are directed to separate containers in a central collection station or terminal by means of a controlled diverter valve. This means that the collection of recyclable fractions interferes with the collection of ordinary solid household/office waste and will have to be "squeezed" in between such rather frequently repeated solid waste collection phases. The phases of recyclable waste fraction collection will clearly be affected by the ordinary solid waste collection and will be restricted in time. It may therefore be rather difficult for users to adapt to such fraction collection phases. The separate containers also take up much space in the terminals that will accordingly have to be oversized. For smaller, recyclable or disposable fractions, the stationary as well as mobile waste collection systems have made use of separate waste inlets or waste inlet sections for each of the waste fractions. This solution will, in combination with a temporary storage at the respective inlets, enable secure waste fraction handling, but will also add further to the investment costs as well as to the space requirement.

To overcome the above described disadvantages and problems with the known techniques, the present invention suggests a novel approach for the collection and management of recyclable or disposable waste fractions and intended for use in a vacuum waste collection system having at least one waste inlet that through transport piping is connected to a storage container. According to the invention a common waste inlet is used for multiple, separately deposited and individually identifiable waste fractions that may be received in the system in accordance with a set up waste fraction time schedule. Such a procedure will enable efficient use of the common waste inlet and very secure and cost effective collection of different recyclable, disposable or even hazardous fractions. This will clearly contribute not only to an economically attractive fraction collection but also to an environmentally safe handling of different kinds of waste fractions.

FIGS. 1-4 illustrate a first embodiment of a vacuum operated system 1 of the invention, intended generally for the collection and handling of waste W from residential, office or hospital areas. FIG. 1 illustrates the basic principles of the invention applied to a typical example of a prior art vacuum operated waste collection system 1 having a waste inlet 2 as a waste collection point. The waste inlet has a waste inlet opening 2A closable by means of a waste inlet door 2B. Through an under ground G chute section 9 and a controlled discharge valve DV the waste inlet 2 is connected to transport piping 3 of the system. This valve DV may be of any conventional kind normally used in such systems. It will therefore not be specifically described. In this drawing figure is illustrated a waste system 1 that is a stationary type system where waste is transported through transport piping 3 communicating with a central collection station or terminal 4 having a very schematically illustrated storage container 5 common for multiple fractions. Vacuum for the waste transport to the container 5 is generated at said station, and the waste container 5 is normally transported away for emptying by means of waste trucks. Specifically, in the illustrated system 1 the waste inlet underground chute section 9 forms a temporary storage space provided above the discharge valve DV for temporarily storing waste disposal packages 6 and for controlling communication between the waste inlet 2 and the transport piping 3.

The system 1 is shown having one waste inlet 2 for receiving waste, bur may naturally comprise any appropriate number of spaced waste inlets 2, each intended for receiving all of the multiple fractions $F_1$, $F_2$, $F_3$ . . . $F_n$ that are deposited in waste disposal packages 6-$F_1$, 6-$F_2$, 6-$F_3$ . . . 6-$F_n$ in a part of a residential or other area. Thus, the at least one waste inlet 2 is common for disposal packages 6 that each contain only one of the multiple waste fractions $F_1$, $F_2$, $F_3$ . . . $F_n$ and that each carry their dedicated waste fraction identifying information 7-$F_1$, 7-$F_2$, 7-$F_3$ . . . 7-$F_n$ being unique for each of the multiple fractions $F_1$, $F_2$, $F_3$ . . . $F_n$. Information reading means 8 are provided at each inlet 2 for receiving and reading the waste fraction identifying information 7-$F_1$, 7-$F_2$, 7-$F_3$ . . . 7-$F_n$ of each disposal package 6-$F_1$, 6-$F_2$, 6-$F_3$ . . . 6-$F_n$ containing one of the multiple waste fractions.

The information 7-$F_1$, 7-$F_2$, 7-$F_3$ . . . 7-$F_n$ provided on the waste disposal packages 6-$F_1$, 6-$F_2$, 6-$F_3$ . . . 6-$F_n$ for identifying the different waste fractions $F_1$, $F_2$, $F_3$ . . . $F_n$ contained therein may be a bar code, a color code or other optically readable information, but may likewise be an RFID-tag, preferably a passive tag, for cost reasons. The information 7-$F_1$, 7-$F_2$, 7-$F_3$ . . . 7-$F_n$ may likewise be of a type allowing interactive information gathering, such as for identifying general or individual user fraction deposit behaviour with regard to waste disposal packages containing the different waste fractions, or for other purposes. Accordingly, the means 8 for reading waste disposal package information 7-$F_1$, 7-$F_2$, 7-$F_3$ . . . 7-$F_n$ may likewise be an optical, RFID-type, or other appropriate information reading means 8 provided at or in the vicinity of the inlets 2. The information reading means 8 transmits gathered information to means 11 for processing the information to control blocking and allowing, respectively, access to the waste inlet opening 2A.

Figure 2:
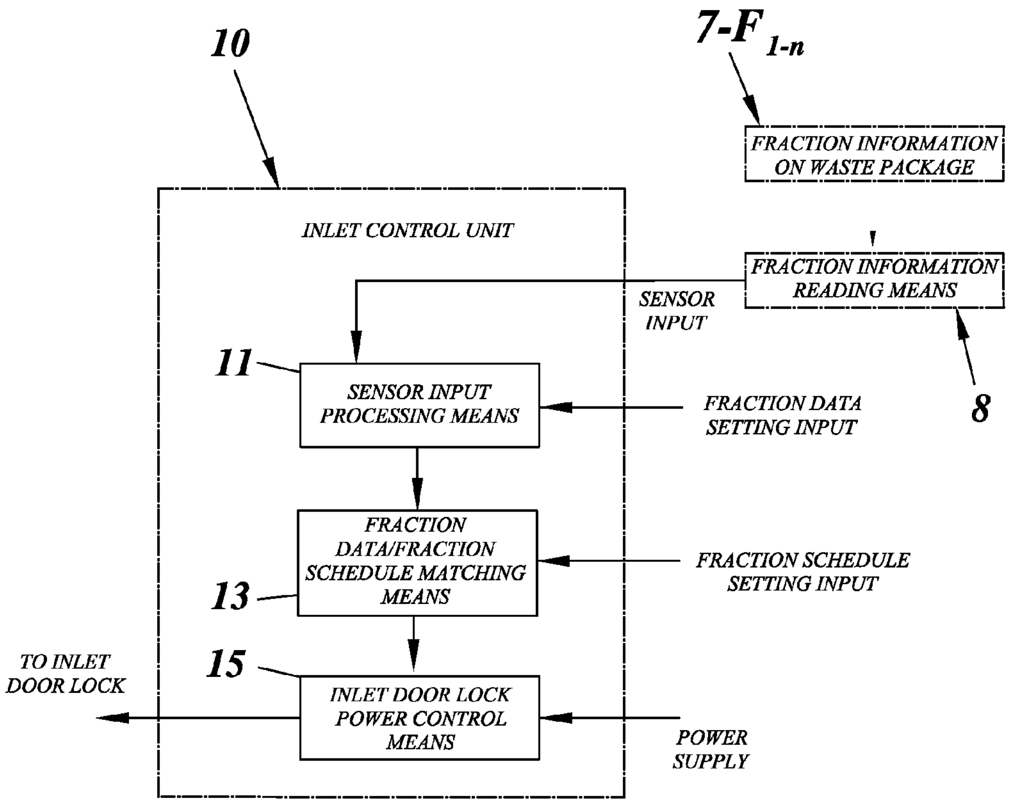
FIG. 2 is a block diagram schematically exemplifying a waste inlet control unit of the system according to the invention.

A control unit 10 that is very schematically illustrated in FIG. 2 and that may either be provided directly on the waste inlet 2 (or in its immediate vicinity) or may be of a distributed configuration, is used to identify each waste disposal package 6-$F_1$, 6-$F_2$, 6-$F_3$ . . . 6-$F_n$ that is presented to the waste inlet 2 to be received therein. The identification is based on the fraction information 7-$F_1$, 7-$F_2$, 7-$F_3$ . . . 7-$F_n$ received and read by the information reading means 8 that in turn inputs the read information to the control unit 10. For that purpose the control unit 10 comprises sensor input processing means 11 for comparing the waste fraction information 7-$F_1$, 7-$F_2$, 7-$F_3$ . . . 7-$F_n$ carried by each package 6-$F_1$, 6-$F_2$, 6-$F_3$ . . . 6-$F_n$ and being unique for the respective fraction $F_1$, $F_2$, $F_3$ . . . $F_n$ with stored waste fraction data. The control unit 10 further comprises means 13 for subsequently, and based on said identification of the waste fraction $F_1$, $F_2$, $F_3$ . . . $F_n$, comparing the identified waste disposal packages 6-$F_1$, 6-$F_2$, 6-$F_3$ . . . 6-$F_n$ with a preset fraction time schedule TS. Specifically said means 13 serve to match the waste fraction information 7-$F_1$, 7-$F_2$, 7-$F_3$ . . . 7-$F_n$ of the packages 6-$F_1$, 6-$F_2$, 6-$F_3$ . . . 6-$F_n$ to predetermined fraction time schedule time periods $P_{1-n}$ that belong to the respective fraction $F_1$, $F_2$, $F_3$ . . . $F_n$. The control unit 10 also comprises means 15 for controlling release and activation of an inlet door lock 16, to allow access to a waste inlet opening 2A during the predetermined fraction time schedule time periods $P_{1-n}$ that belong to the respective fraction and to block access to the waste inlet for the identified package at all other times. The identified fraction information is then used to control blocking and allowing, respectively, of access to the waste inlet opening 2A based on an output from the control unit 10.

Figure 4:
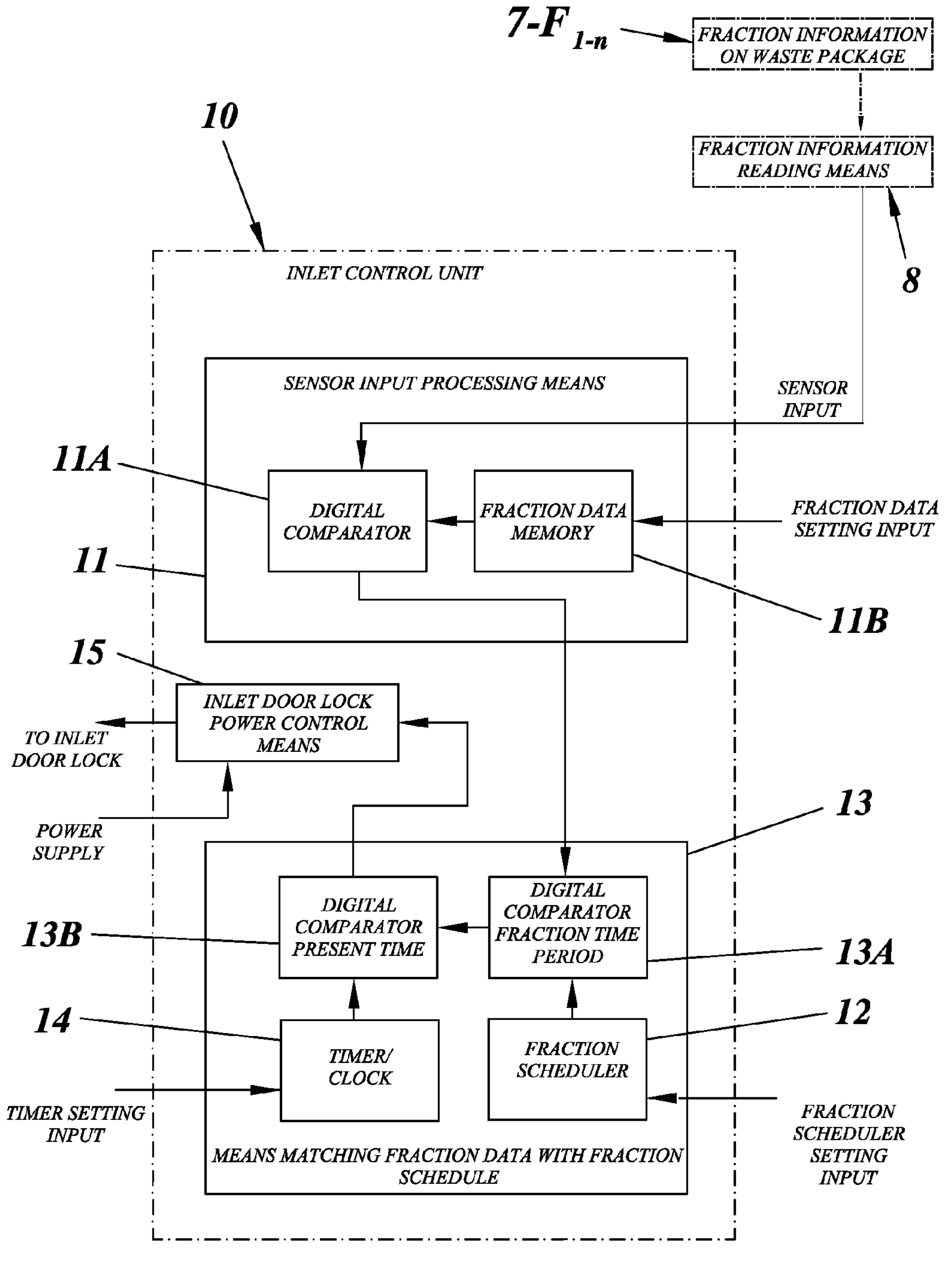
FIG. 4 is a block diagram of one practical embodiment of the control unit of FIG. 2.

In FIG. 4 is illustrated an exemplifying practical embodiment of the control unit 10 of the invention. As a means for identifying each waste disposal package 6-$F_1$, 6-$F_2$, 6-$F_3$ . . . 6-$F_n$ the control unit 10 is here equipped with an information processing means 11 comprising a digital comparator 11A for comparing information 7-$F_1$, 7-$F_2$, 7-$F_3$ . . . 7-$F_n$ read from the waste disposal packages 6-$F_1$, 6-$F_2$, 6-$F_3$ . . . 6-$F_n$ with fraction data stored in a memory 11B of the processing means 11, to thereby identify the particular fraction $F_1$, $F_2$, $F_3$ . . . $F_n$ deposited in the waste disposal packages 6-$F_1$, 6-$F_2$, 6-$F_3$ . . . 6-$F_n$. The means 13 for comparing the identified waste disposal packages 6-$F_1$, 6-$F_2$, 6-$F_3$ . . . 6-$F_n$ with a preset fraction time schedule TS comprises a fraction scheduler 12 for setting up the fraction time schedule TS, a first digital comparator 13A for matching the identified disposal package fraction $F_1$, $F_2$, $F_3$ . . . $F_n$ with the fraction time schedule time periods $P_{1-n}$ that belong to the respective fraction, a timer/clock 14 for setting up the present time and a second digital comparator 13B for comparing the time periods belonging to the identified disposal package fraction with the present time. The output from said means 13 for comparing the identified waste disposal packages with a preset fraction time schedule controls the means 15 for controlling release and activation of the inlet door lock 16. The door lock 16 may be of any applicable type, such as an electrically or pneumatically moveable locking pin that may be operated in a corresponding manner to allow or block access to the waste inlet 2 opening 2A for individual waste fractions. The means 15 for controlling release and activation of the door lock may accordingly also be of any corresponding, appropriate type.

Waste disposal packages 6-$F_1$, 6-$F_2$, 6-$F_3$ . . . 6-$F_n$ containing one fraction $F_1$, $F_2$, $F_3$ . . . $F_n$ and having been allowed access to the waste inlet 2 during their predetermined access time period $P_{1-n}$ in the preset fraction time schedule TS, are temporarily stored in the waste inlet 2 temporary storage space 9 as long as the discharge valve DV is in its closed position. When the discharge valve DV is opened at fixed or controlled intervals during said time periods, the temporarily stored waste packages 6 containing this fraction are communicated from the inlet 2 to the transport piping 3 and are conveyed to the common waste collection container 5 in the waste collection terminal 4. The container 5 is then emptied, preferably at the end of the respective fraction time period.

Figure 5:
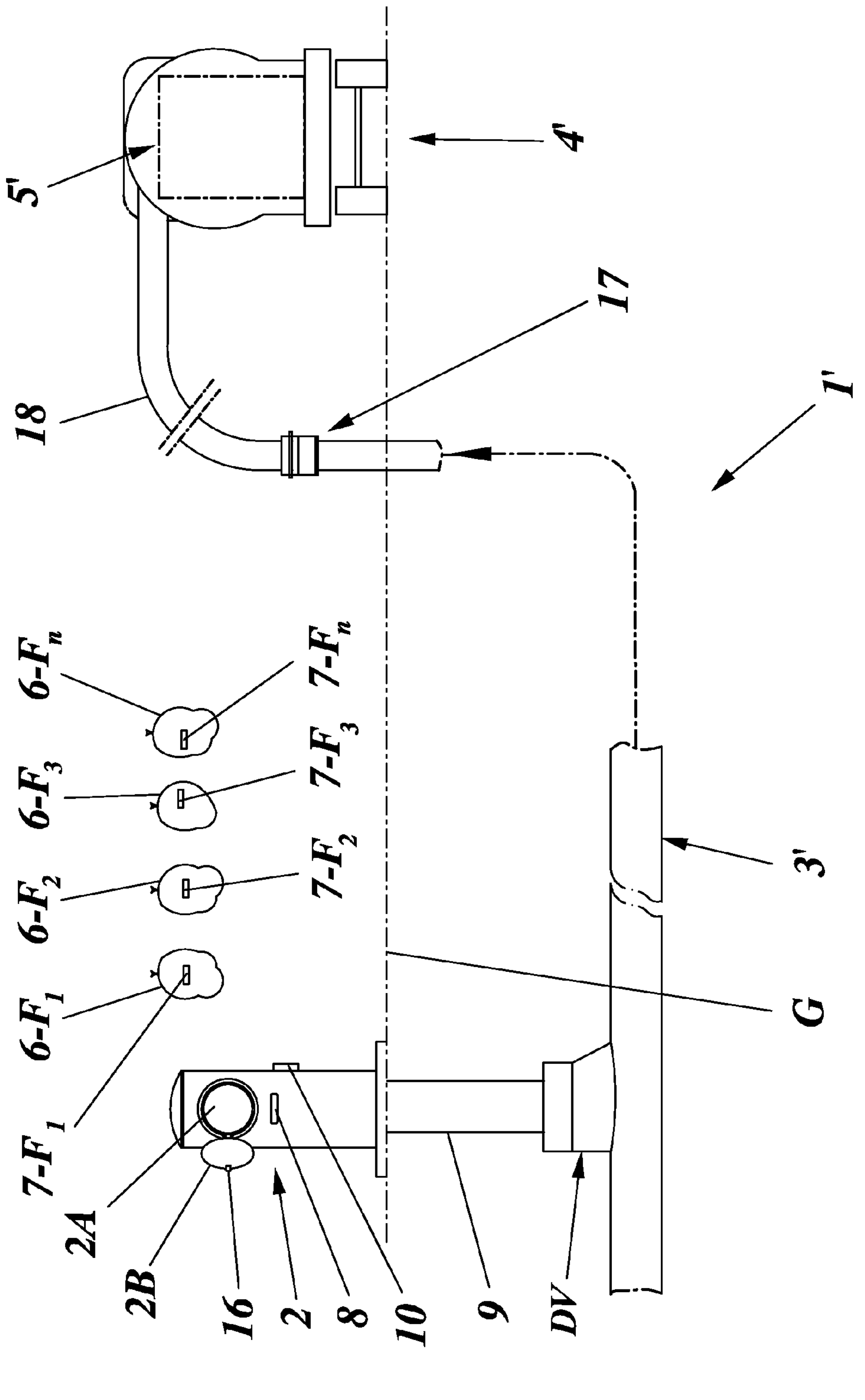
FIG. 5 is a schematical illustration of an exemplary second embodiment of a vacuum waste collection system according to the invention.

In the embodiment of FIG. 5 an alternative application of the invention to a mobile-type vacuum operated waste collection system 1' is illustrated very schematically. Here, the transport piping 3' communicates with a docking station 17 to which a vacuum truck 4' having an integrated waste fraction container 5 common to all fractions is connectable through a truck carried waste pipe 18. In all other respects the mobile system application of the invention may be identical to that of the stationary application.

Figure 3:
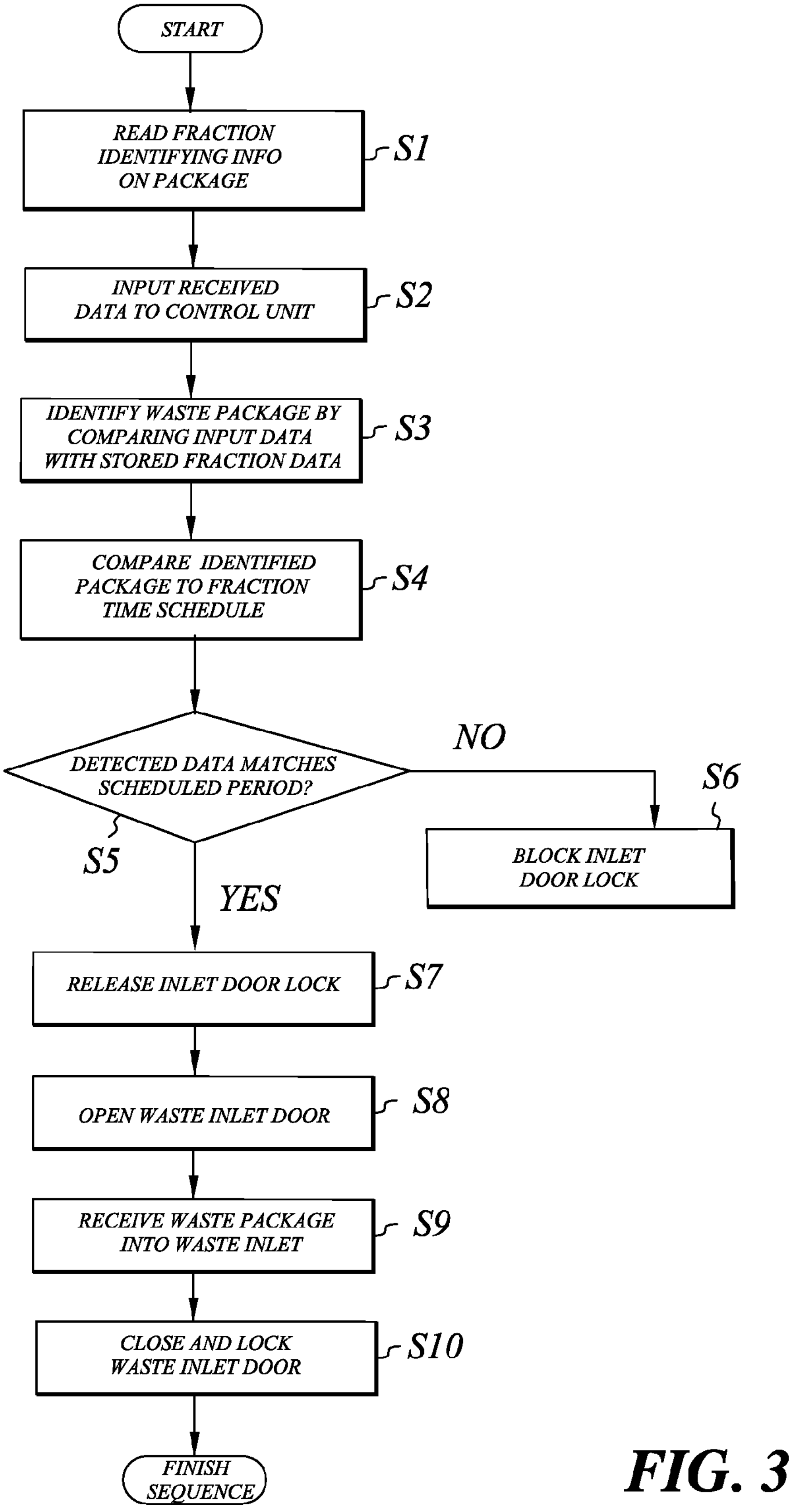
FIG. 3 is a flow chart exemplifying an inventive method of managing waste fractions.

A method according to the invention and intended for collecting and managing waste W that is deposited in waste disposal packages 6-$F_1$, 6-$F_2$, 6-$F_3$ . . . 6-$F_n$ and that is to be received in a vacuum operated waste collection system, as described above, shall now be briefly explained with reference specifically to FIG. 3. The waste disposal packages 6-$F_1$, 6-$F_2$, 6-$F_3$ . . . 6-$F_n$ each contain one of multiple waste fractions $F_1$, $F_2$, $F_3$ . . . $F_n$ to be received in the system through a common waste inlet 2. According to the invention waste fraction information 7-$F_1$, 7-$F_2$, 7-$F_3$ . . . 7-$F_n$ that is unique for each fraction $F_1$, $F_2$, $F_3$ . . . $F_n$ is provided on the waste disposal packages 6-$F_1$, 6-$F_2$, 6-$F_3$ . . . 6-$F_n$. The waste fraction information 7-$F_1$, 7-$F_2$, 7-$F_3$ . . . 7-$F_n$ is read in step S1 by information reading means 8 and the read information is input to a control unit 10 in step S2, for processing thereby. Waste W will not be received by a waste inlet 2 until each presented waste disposal package 6-$F_1$, 6-$F_2$, 6-$F_3$ . . . 6-$F_n$ has first been identified in step S3 by comparing waste fraction information 7-$F_1$, 7-$F_2$, 7-$F_3$ . . . 7-$F_n$ with waste fraction data stored in the memory 11B of the information processing means 11. In step S4 the identified waste disposal packages 6-$F_1$, 6-$F_2$, 6-$F_3$ . . . 6-$F_n$ are then compared with a preset fraction time schedule TS, set up in the fraction scheduler 12, for matching the waste fraction information 7-$F_1$, 7-$F_2$, 7-$F_3$ . . . 7-$F_n$ of the packages 6-$F_1$, 6-$F_2$, 6-$F_3$ . . . 6-$F_n$ to predetermined fraction time schedule time periods $P_{1-n}$ that belong to the respective fraction. Based on the result of this data comparison, in step S5, access to an inlet opening 2A of the waste inlet is allowed in step S7 for each identified package 6-$F_1$, 6-$F_2$, 6-$F_3$ . . . 6-$F_n$ during the predetermined fraction time schedule time periods $P_{1-n}$ that belong to the respective fraction and access to the waste inlet 2 is blocked in step S6 for each identified package at all other times. Such allowing of access to a waste inlet 2 that is performed in step 7 automatically releases the lock 16 of the waste inlet 2 door 2B, when the information reading means identifies a waste disposal package 6-$F_1$, 6-$F_2$, 6-$F_3$ . . . 6-$F_n$ containing a waste fraction $F_1$, $F_2$, $F_3$ . . . $F_n$ that is allowed access during the time period in question. As the inlet door lock 16 is released the inlet door 2B may be opened in step S8 to receive a waste disposal package in the waste inlet 2 in step S9. Normally, the door lock 16 is then automatically locked after closing the inlet door in step S10. On the contrary, the lock 16 of the waste inlet 2 door 2B covering the inlet opening 2A, is activated or remains activated in an access blocking phase, in step S6, when the information reading means identifies a waste disposal package 6-$F_1$, 6-$F_2$, 6-$F_3$ . . . 6-$F_n$ containing a waste fraction $F_1$, $F_2$, $F_3$ . . . $F_n$ that is not allowed access during the time period in question. After the receipt of waste W in step S9 it is intermittently conveyed from at least one waste inlet 2, through waste transport piping 3; 3', and to a waste collection container 5; 5' for storing waste W before removal.

In a further development of the method of the invention, the inlet door may be automatically opened subsequent to releasing the locked state of the waste inlet 2 door 2B, as described. The opened state of the inlet door 2B may be maintained for a set time T, and after the set time has run out, the inlet door is automatically closed and automatically locked.

In dependence of the type of system that the method is applied to, all deposited waste fractions $F_1$, $F_2$, $F_3$ . . . $F_n$ are conveyed to a waste container 5 of a central terminal 4 or alternatively to a waste container 5' of a vacuum truck 4', from which the collected waste W is then emptied in conventional manners. The preset fraction time schedule TS that is set up in the fraction scheduler 12 is optionally selectable to allow access to the waste inlet 2 opening 2A for the individual waste fractions $F_1$, $F_2$, $F_3$ . . . $F_n$ during e.g. specified hours of each day, during specified days of each week or during specified weeks of each month.

The deposited waste disposal packages 6-$F_1$, 6-$F_2$, 6-$F_3$ . . . 6-$F_n$ are normally temporarily stored in the temporary storage space 9 above the discharge valve DV controlling communication between the waste inlet 2 and the transport piping 3; 3'. Specifically, the waste packages 6-$F_1$, 6-$F_2$, 6-$F_3$ . . . 6-$F_n$ containing one fraction $F_1$, $F_2$, $F_3$ . . . $F_n$ are temporarily stored in the storage space during the predetermined access time period $P_{1-n}$ of said fraction in the preset fraction time schedule TS. At fixed or controlled intervals during said time period $P_{1-n}$ waste packages 6-$F_1$, 6-$F_2$, 6-$F_3$ . . . 6-$F_n$ containing this fraction $F_1$, $F_2$, $F_3$ . . . $F_n$ are conveyed to a waste collection container 5 or 5' in the central waste collection terminal 4 or in the vacuum truck 4', said container being common for all fractions $F_1$, $F_2$, $F_3$ . . . $F_n$. The common container 5 or 5' is then emptied between each two successive fraction time periods in the time schedule in the stationary type system 1, and after finishing collecting waste W from this and/or other inlets 2 in the mobile type system 1'.

By providing on the waste disposal packages 6-$F_1$, 6-$F_2$, 6-$F_3$ . . . 6-$F_n$ interactive information 7-$F_1$, 7-$F_2$, 7-$F_3$ . . . 7-$F_n$ the gathered information may be used for identifying general or individual user fraction deposit behaviour with regard to waste disposal packages 6-$F_1$, 6-$F_2$, 6-$F_3$ . . . 6-$F_n$ containing the different waste fractions $F_1$, $F_2$, $F_3$ . . . $F_n$. As mentioned, waste disposal packages 6-$F_1$, 6-$F_2$, 6-$F_3$ . . . 6-$F_n$ may be provided with package information 7-$F_1$, 7-$F_2$, 7-$F_3$ . . . 7-$F_n$ in the form of bar codes, color codes or RFID-tags that may be read by means of optical, RFID-type or other appropriate information reading means 8 at the inlets 2. The gathered information is transmitted to and is processed in the control unit 10, and based on an output therefrom blocking and allowing, respectively, of access to the waste inlet opening 2A is controlled.

An exemplifying example of a fraction time schedule set up in accordance with the invention will now be given below:

EXAMPLE

FRACTION TIME SCHEDULE TS

| TIME PERIODS | RECEIVED FRACTIONS $F_1$-$F_5$ | | | | |
|---|---|---|---|---|---|
| $P_1$-$P_5$ | $F_1$ | $F_2$ | $F_3$ | $F_4$ | $F_5$ |
| $P_1$ (Week 1) | allowed | blocked | blocked | blocked | blocked |
| $P_2$ (Week 2) | blocked | allowed | blocked | blocked | blocked |
| $P_3$ (Week 3) | blocked | blocked | allowed | blocked | blocked |
| $P_1$ (Week 4) | allowed | blocked | blocked | blocked | blocked |
| $P_4$ (Week 5) | blocked | blocked | blocked | allowed | blocked |
| $P_5$ (Week 6) | blocked | blocked | blocked | blocked | allowed |
| $P_1$ (Week 7) | allowed | blocked | Blocked | Blocked | Blocked |
| $P_2$ (Week 8) | Blocked | allowed | blocked | blocked | blocked |
| $P_3$ (Week 9) | blocked | blocked | allowed | blocked | blocked |
| $P_4$ (Week 10) | blocked | blocked | blocked | allowed | blocked |
| $P_1$ (Week 11) | allowed | blocked | blocked | blocked | blocked |
| $P_5$ (Week 12) | blocked | blocked | blocked | blocked | allowed |

An exemplary further embodiment of a waste inlet that may be used in the waste collection system according to the invention will now be described with reference to FIGS. 6-10C. When using waste inlets in a conventional waste collection system, a user generally has to open the door of the waste inlet, which is inconvenient for the user. There is also a problem of hygiene since a handle of the inlet is commonly used by many users. In addition, it is difficult for the user to lift and introduce a waste package/bag with only one hand while opening the inlet door with the other hand. In order to improve user convenience and hygiene in using an automatic waste collection system a waste inlet is therefore provided, which performs all processes including recognition of information on the waste by the waste inlet, unlocking of an inlet door of the waste inlet, and opening and closing of the inlet door, automatically and sequentially. The present invention thus provides a waste inlet of an automatic waste collection system, achieving more hygienic and convenient use of the waste inlet. This is done by enabling the user to save the necessity of directly opening an inlet door of the waste inlet and to more conveniently put the waste bag in the inlet after access to the inlet opening has been allowed for instance by the above described system.

Figure 6:
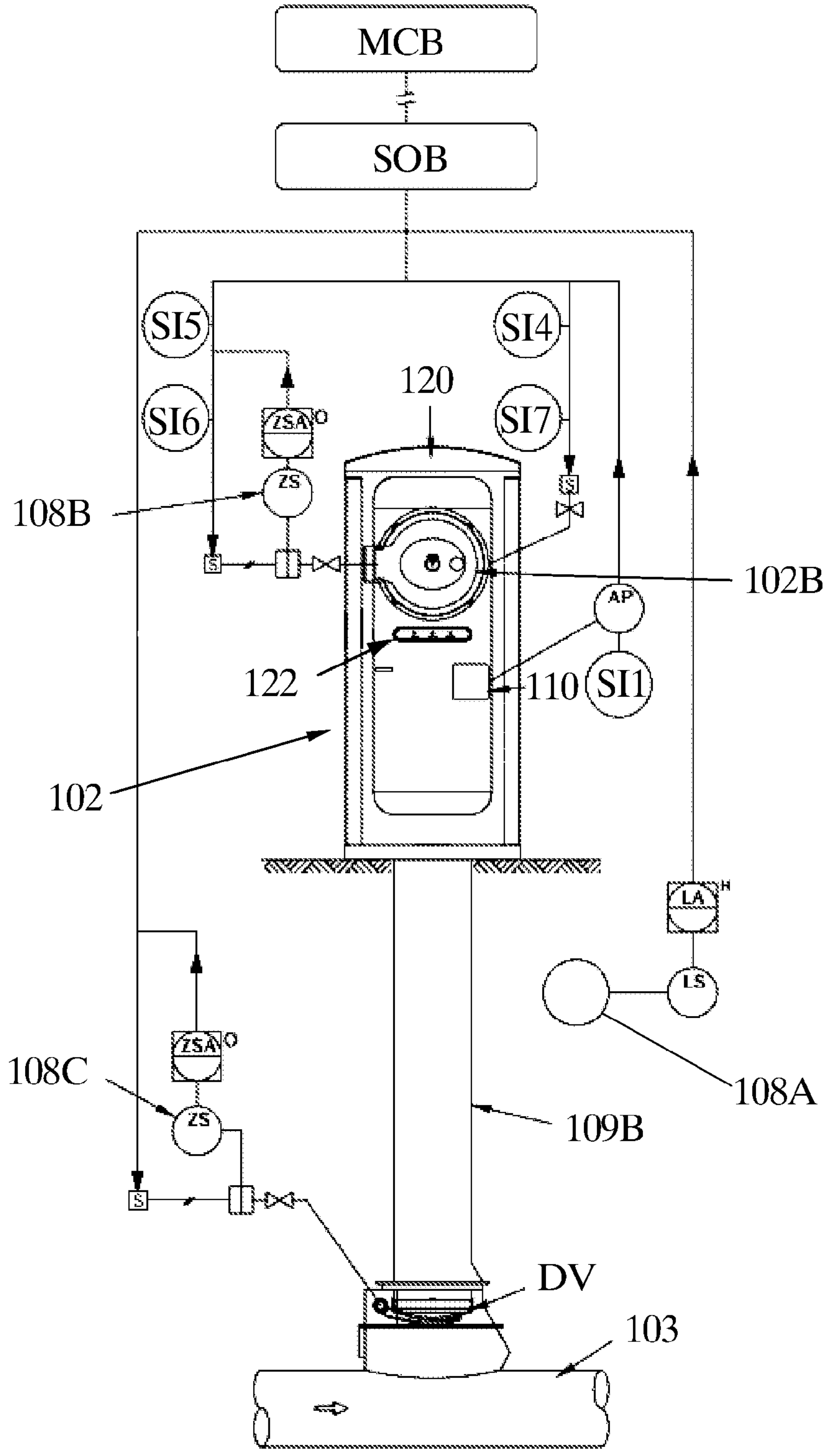
FIG. 6 illustrates the structure of a waste inlet according to an embodiment of the present invention.

FIG. 6 is a structural view of a waste inlet 102 of this embodiment of the present invention. As shown in the drawing, a housing 120 of the waste inlet 102 comprises an inlet door 102B for inputting waste, a recognition system 110, and a lighting board 122 for displaying an operational state of the waste inlet. In the waste inlet housing 120 are provided a door opening and closing operation sensor 108B, an above-ground chute 109A (FIGS. 8, 9) and a chute level sensor 108A (FIGS. 8, 9) detecting a waste level in the chutes 109A and 109B. The above-ground chute 109A is extended down to a conveying pipe 103 buried underground, through an underground chute 109B. In addition, a discharge valve DV is provided, along with a valve opening and closing operation sensor 108C, at a connection part between the underground chute 109B and the conveying pipe 103 to discharge waste received in the chutes 109A and 109B to the conveying pipe 103. The recognition system 110 is capable of recognizing waste input information, for example, information on a waste bag or user information. Radio frequency identification (RFID), a magnetic card, a barcode and the like may be applied to the recognition system 110.

The recognition system 110 may further function to transmit an information recognition signal to a supervisory operational board, referred to as SOB below, of the waste inlet 102. When a locked state of the inlet door 102B is released and the inlet door 102B is therefore opened, the door opening and closing operation sensor 108B transmits a signal regarding the operation of the inlet door 102B to the SOB. Accordingly, in T seconds, the SOB generates and transmits a signal for commanding closing of the inlet door 102B, thereby automatically controlling opening and closing of the inlet door 102B.

In addition, the chute level sensor 108A detects an amount of the waste received in the above-ground chute 109A. When waste reaches a pre-stored threshold value the chute level sensor 108A detects this and accordingly generates and transmits a corresponding signal. The SOB to which the signal is transmitted performs an interlock function to stop generation of a signal for opening the inlet door 102B, such that the user cannot input waste into the waste inlet any longer.

When the automatic waste collection system begins waste transport the discharge valve DV is opened. Waste stored in the chutes 109A and 109B disposed at an upper end of the discharge valve DV is discharged to the transport pipe 103 disposed at a lower end and therefore conveyed toward a collection center. At this time, the valve opening and closing operation sensor 108C detects opening of the discharge valve DV and accordingly generates and transmits a corresponding signal. The SOB receiving the signal performs the interlock function to stop generation of the inlet door opening signal, such that the user cannot use the waste inlet during an opened state of the discharge valve DV.

Additionally, the SOB displays information on operational states of the waste inlet in accordance with the signals from the respective sensors 108A, 108B and 108C, through an indicator lamp of the lighting board 122. The devices in the waste inlet are operated through signal communication with and under the command of the SOB. Also, the SOB is operated under the control of a main control board MCB of the collection center.

Figure 7:
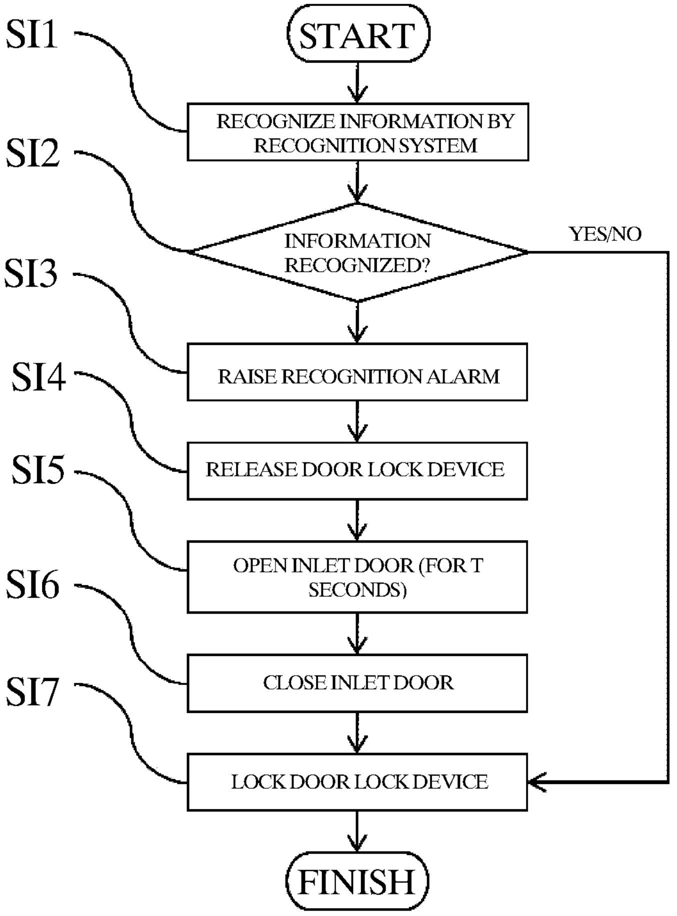
FIG. 7 is a flowchart for explaining the operations of the waste inlet according to the embodiment of the present invention.

FIG. 7 is a flowchart explaining the operations of the waste inlet 102 according to this embodiment of the invention. Referring to FIG. 7, the recognition system 110 provided in the waste inlet recognizes information on the waste to be received (SI1) and transmits the signal regarding recognition of the information to the SOB (SI2). When the recognition system 110 is capable of recognizing the information, a recognition alarm is raised (SI3) and accordingly the locked state of the inlet door 102B is released (SI4) and the inlet door 102B is opened (SI5). The inlet door 102B maintains the opened state for T seconds and closes after T seconds have passed (SI6). As it is automatically closed, the inlet door 102B is returned to the locked state (SI7). Here, the opening duration T of the inlet door 102B may be varied as desired without specific limit, by a system manager.

As explained above, in the waste inlet according to this embodiment of the present invention, the overall waste receiving operations are performed sequentially and automatically. Here, the device for achieving the automatic opening and closing operations of the waste inlet is not specifically limited. Thus, any mechanism can be applied as long as it enables automatic operations of the waste inlet. Therefore, for example, a pneumatic system using a pneumatic cylinder or an electrical system using a geared motor may be applied to open and close the inlet door. For locking of the inlet door 102B, the pneumatic system may use the pneumatic cylinder or may further use a door lock device. When using the electrical system, on the other hand, the geared motor is used and a door lock device may be further used.

Figure 8B:
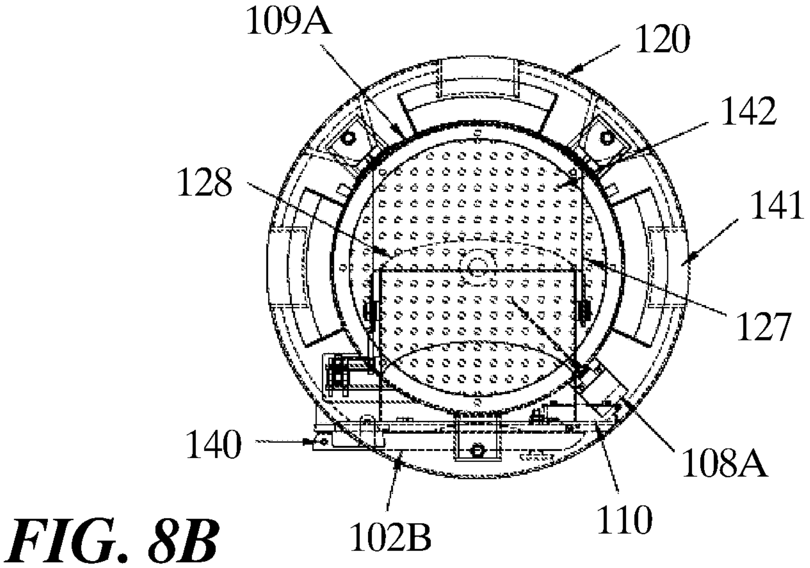
FIG. 8B is a plan view of the waste inlet shown in FIG. 7A.
Figure 8A:
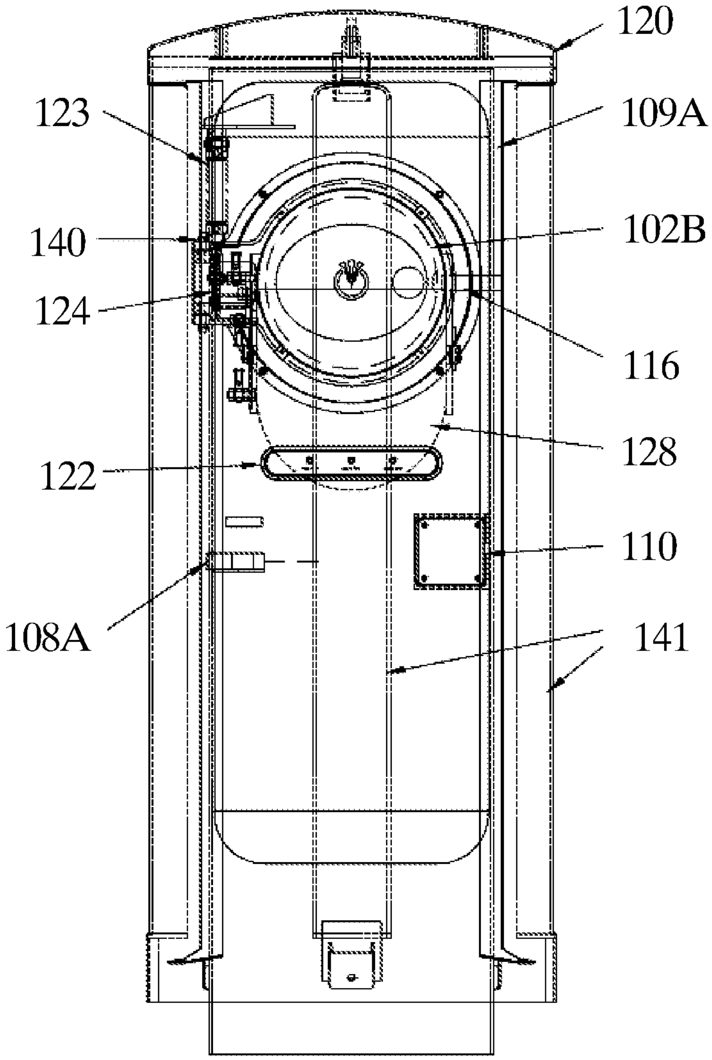
FIG. 8A is a front view of a waste inlet operated by a pneumatic system and equipped with a door lock device according to the invention.
Figure 9A:
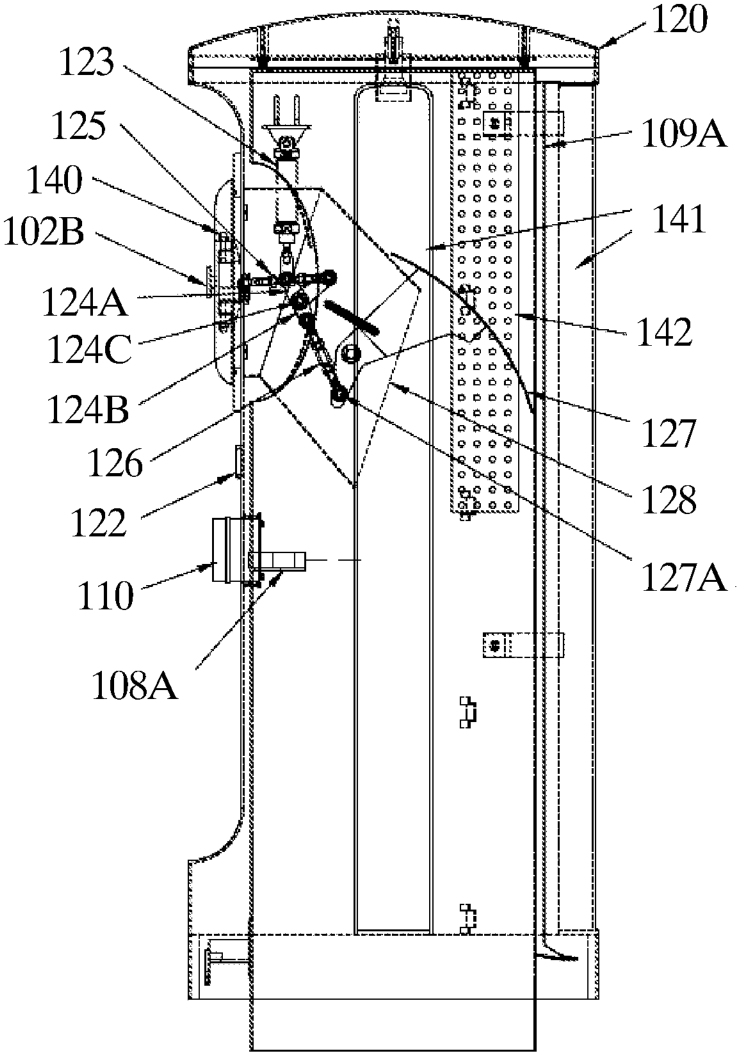
FIG. 9A is a side view of the waste inlet shown in FIG. 7A.
Figure 9B:
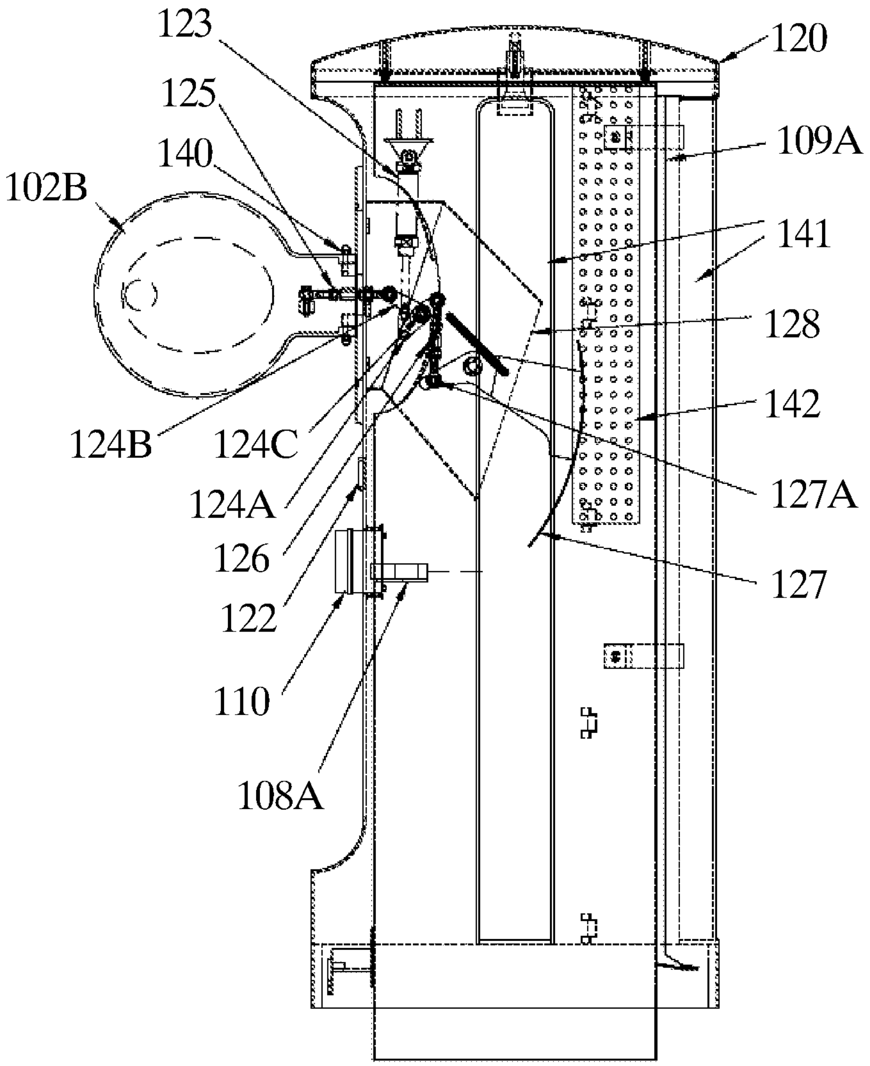
FIG. 9B shows an opened state of the waste inlet in FIG. 7A.

Hereinafter, the automatic opening and closing operations of the inlet door 102B by the pneumatic system will be described in detail with reference to FIGS. 8A, 8B, 9A and 9B. FIG. 8A is a front view of the waste inlet operated by the pneumatic system and equipped with a door lock device 116, and FIG. 8B is a plan view of FIG. 8A. FIG. 9A is a side view of the waste inlet shown in FIG. 8A. FIG. 9B shows an opened state of the waste inlet of FIG. 9A. As shown in the drawings, the waste inlet largely comprises the housing 120 and a chute part. The chute part is divided into an above-ground chute 109A and an underground chute 109B. The housing 120 is structured to enclose the above-ground chute 109A to thereby protect it. The component devices provided in the housing 120 have already been explained with FIG. 1.

An input assisting plate 128 is formed inwardly at the inlet door 102B. Specifically, the input assisting plate 128 is in contact with an inside of the inlet door 102B, having a cylindrical plate form extended slantly into the above-ground chute 109A to promote the input of waste into the above-ground chute 109A. During the automatically performed sequential operations of the waste inlet, the inlet door 102B is maintained in the opened state for T seconds and is automatically closed after the T seconds have passed. As shown in the drawings, in a waste inlet using the pneumatic system, automatic opening and closing operations of the inlet door 102B are performed by a pneumatic cylinder 123. When the recognition system 110 recognizes information on the received waste and the door lock device 116 is released, compressed air is supplied to the pneumatic cylinder 123 for T seconds, thereby extending a rod of the pneumatic cylinder 123. Accordingly, a first link device 124A in connection with the pneumatic cylinder 123 is pivoted anticlockwise about a first fixing point 124C, and then a second link device 124B is pivoted anticlockwise about the same first fixing point 124C. The second link device 124B comprises two arms, one end of which are connected to one end of an inlet door opening and closing rod 125 and one end of a safety plate pivoting rod 126, respectively. The inlet door opening and closing rod 125 is also connected to the inlet door 102B by the other end. By the pivoting of the second link device 124B, the inlet door opening and closing rod 125 is advanced toward the front of the waste inlet. Thereby, the inlet door 102B connected to the other end of the inlet door opening and closing rod 125, is opened. The other end of the safety plate pivoting rod 126 is in connection with the second link device 124B connected to a safety plate 127, and the safety plate 127 is fixed to a second fixing point 127A fowled on the input assisting plate 128. As the second link device 124B is pivoted counter clockwise, the safety plate pivoting rod 126 is operated upward. The safety plate 127 connected to the other end of the safety plate pivoting rod 126 is pivoted clockwise with respect to the second fixing point 127A, thereby blocking opening of the input assisting plate 128 directed to the chutes 109A and 109B, for the user's safety.

Therefore, compressed air is supplied to the pneumatic cylinder 123 for T seconds, and the inlet door 102B is automatically opened in association with extension of the cylinder rod of the pneumatic cylinder 123. After T seconds have passed, supply of compressed air is suspended. As the compressed air in the pneumatic cylinder 123 is discharged, the inlet door 12 is automatically closed by a spring which is provided in the waste inlet in consideration of the user's safety. Simultaneously, the door lock device 116 is locked. Reference symbols 141 and 142 in the drawings refer to an air inlet 141 formed at the housing 120 and another air inlet 142 formed at the above-ground chute 109A. When the collection center starts the waste collection and therefore the discharge valve DV is opened to discharge the waste, the atmospheric air is drawn in through the air inlets 141 and 142 so that the waste can be smoothly conveyed.

Figure 10A:
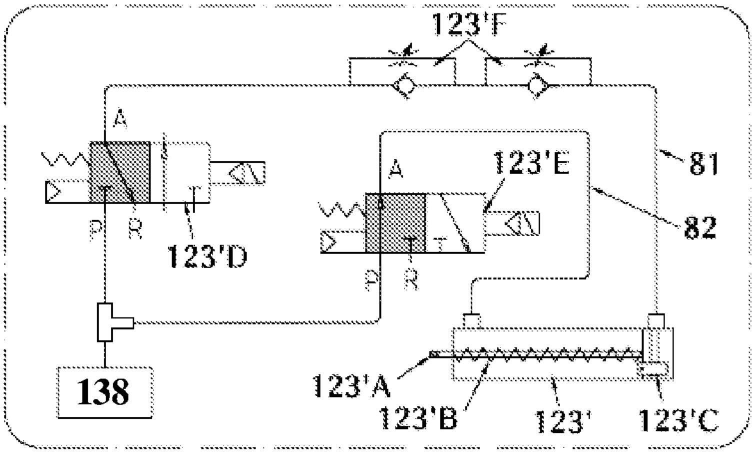
FIG. 10A is an operation system diagram of a pneumatic cylinder in a locked state of an inlet door of the waste inlet operated by the pneumatic system and lacking the door lock device of the previous embodiment.
Figure 10B:
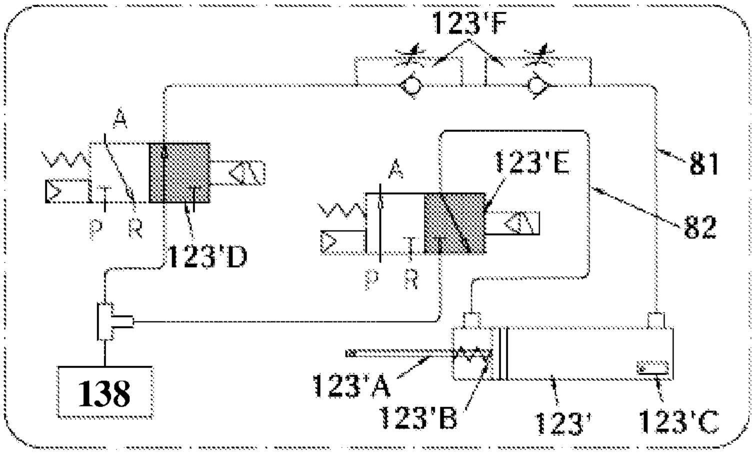
FIG. 10B is an operation system diagram of the pneumatic cylinder in an opened state of the waste inlet door that is operated by the pneumatic system and that lacks the door lock device.
Figure 10C:
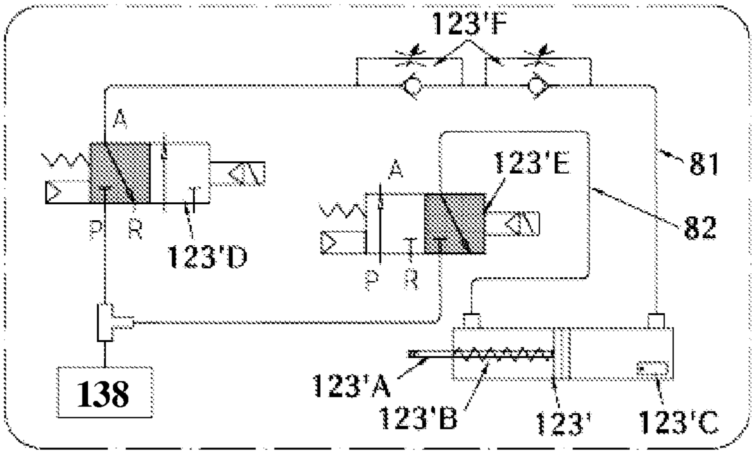
FIG. 10C is a diagram of the operation of the pneumatic cylinder in a closed state of the waste inlet door operated by the pneumatic system and lacking a door lock device.

FIG. 10A to FIG. 10C are operation system diagrams of a pneumatic cylinder 123' according to another embodiment of the invention, corresponding to states of the inlet door in the waste inlet operated by the pneumatic system and lacking the door lock device. The waste inlet illustrated herein is the same as the one shown in FIGS. 8 and 9 except that the door lock device 116 is omitted. The pneumatic cylinder 123' of this embodiment replaces the pneumatic cylinder 123 of FIGS. 8 and 9. In addition to the function of the pneumatic cylinder 123 that automatically opens and closes the inlet door 102B, the pneumatic cylinder 123' has a door locking function. Referring to the drawings, to achieve the door locking function, the pneumatic cylinder 123' according to this other embodiment comprises pneumatic lines 81, 82 connected to upper and lower parts, respectively, of the pneumatic cylinder 123' so that compressed air can flow in and out through the upper and lower parts of the pneumatic cylinder 123'. The compressed air flowing in and out through the two pneumatic lines 81, 82 is supplied from an air compressor 138 of the collection center. Also, two solenoid valves 123'D and 123'E are provided on the respective pneumatic lines 81 and 82 to control inflow and outflow of compressed air with respect to the pneumatic cylinder 123'. The pneumatic cylinder 123' comprises an extendable cylinder rod 123'A being formed therein, and a spring 123'B fitted around the cylinder rod 123'A and contracted within the cylinder 123' as the cylinder rod 123'A is extended. A limit sensor 123'C is further provided at the outside of the pneumatic cylinder 123' to detect a position of the cylinder rod 123' in the cylinder 123'. As compressed air flows in through the upper part of the pneumatic cylinder 123' and flows out through the lower part of the pneumatic cylinder 123', the cylinder rod 123'A moves down, thereby opening the inlet door. On the contrary, as compressed air flows out through the upper part and flows in through the lower part of the pneumatic cylinder 123', the cylinder rod 123'A is moved upward, thereby closing the inlet door. Here, speed controllers 123'F may be provided to control the flow rate of the air, so that the inlet door can be opened and closed more smoothly. The speed controllers 123'F controlling the speed of air flowing in and out may be in the form of a direct mounting type directly mounted to the pneumatic cylinder 123' or a line mounting type.

The speed controllers 123'F according to this embodiment may be provided on the pneumatic lines 81 and 82 disposed between the solenoid valves 123'D and 123'E, or at upper and lower parts of the pneumatic cylinder 123' so that the pneumatic tubes 81 and 82 are connected to the speed controllers 123'D. Below, will be described in detail the opening and closing, and locking operations of the inlet door using the speed controllers 123'F, the solenoid valves 123'D and 123'E, and the cylinder 123'.

FIG. 10A is an operational system diagram of the pneumatic cylinder 123' in a locked state of the inlet door in the waste inlet operated by the pneumatic system and lacking the door lock device, according to this embodiment of the present invention. When the inlet door is closed, the cylinder rod 123'A is moved up into the pneumatic cylinder 123'. When the limit sensor 123'C mounted to the pneumatic cylinder 123' detects the cylinder rod 123'A reaching a predetermined position, the solenoid valve 123'D connected to the upper pneumatic line 81 of the pneumatic cylinder 123' is opened whereas the solenoid valve 123'E connected to the lower pneumatic line 82 is closed to thereby lock the inlet door. Accordingly, the solenoid valve 123'D connected to the upper part of the pneumatic cylinder 123' maintains a disconnecting state of the pneumatic line 81 which connects the upper part of the pneumatic cylinder 123' with the air compressor 138. The solenoid valve 123'E connected to the lower part of the pneumatic cylinder 123' maintains a connecting state of the pneumatic line 82 which connects the lower part of the pneumatic cylinder 123' with the air compressor 138. Accordingly, compressed air does not flow through the upper part of the pneumatic cylinder 123' but flows in only through the lower part and therefore the cylinder rod 123'A cannot move downward. As a result, the inlet door is converted to a locked state in which the inlet door cannot be opened freely by the user without recognition of predetermined information.

FIG. 10B is an operation system diagram of the pneumatic cylinder 123' in an opened state of the inlet door in the inlet operated by the pneumatic system and lacking the door lock device. The inlet door can be opened as the solenoid valves 123'D and 123'E connected to the upper and the lower parts of the pneumatic cylinder 123' are closed and opened, respectively, when the user has the predetermined information recognized by the waste inlet. Specifically, in the closed state of the upper solenoid valve 123'D, the pneumatic line 81 connecting the upper part of the pneumatic cylinder 123' with the air compressor 138 is converted to the connecting state. In the opened state of the lower solenoid valve 123'E, the pneumatic line 82 connecting the lower part of the pneumatic cylinder 123' with the air compressor 138 is converted to the disconnecting state.

Consequently, since compressed air flows in through the upper part of the pneumatic cylinder 123' while flowing out through the lower part, the cylinder rod 123'A is moved downward, thereby opening the inlet door. Also, the opened states of the solenoid valves 123'D and 123'E are maintained for T seconds so that the inlet door is opened for T seconds. During this time, the user is able to input the waste. Here, the speed controller 123'F controls speed of the air flowing into the upper part of the pneumatic cylinder 123', so that the inlet door can be smoothly opened.

FIG. 10C is an operation system diagram of the pneumatic cylinder in a closed state of the inlet door of the waste inlet operated by the pneumatic system and lacking the door lock device. The inlet door can be closed as the upper solenoid valve 123'D and the lower solenoid valve 123'E are both opened when the user has the predetermined information recognized by the waste inlet. Specifically, the upper solenoid valve 123'D converts the pneumatic line 81 connecting the upper part of the pneumatic cylinder 123' with the air compressor 138, to a disconnecting state. The lower solenoid valve 123'E converts the pneumatic line 82 connecting the lower part of the pneumatic cylinder 123' with the air compressor 138 to a disconnecting state. Thus, since compressed air flows out through the upper part of the pneumatic cylinder 123' and also through the lower part of the pneumatic cylinder 123', the cylinder rod 123'A is moved into the pneumatic cylinder 123' without being influenced by any pneumatic pressure. Accordingly, the cylinder rod 123'A is moved up by a restoring force of the spring 123'B which is compressed by a downward operation of the cylinder rod 123'A, thereby closing the inlet door. Here, the speed controller 213'F controls speed of the air flowing from the upper part of the pneumatic cylinder 123' so that the inlet door can be smoothly closed. Such speed controlling is performed to prevent a sudden flow of compressed air into the lower part of the pneumatic cylinder 123' and sudden closing of the inlet door, considering user's safety. When the cylinder rod 123'A reaches the predetermined position in the pneumatic cylinder 123' the limit sensor 123'C detects this and operates to convert the solenoid valves 123'D and 123'E to the opened state and the closed state, respectively. The inlet door is converted again to the locked state.

It should be obvious that the described automatically opening and closing inlet may with minor modifications be used for the previously described fraction management system of the invention.

The invention has been described in connection with what is presently considered to be the most practical and preferred embodiments, but it is to be understood that the invention is not limited to the disclosed embodiments. The invention is therefore intended to cover various modifications and equivalent arrangements as well as combinations of features from the different embodiments that are included within the spirit and scope of the appended claims.

The invention claimed is:

1. A method of collecting and managing waste (W) wherein the waste is deposited in waste disposal packages (6-$F_1$, 6-$F_2$, 6-$F_3$. . . 6-$F_n$), and is received in a vacuum operated waste collection system (1; 1'), and wherein waste is intermittently conveyed from at least one waste inlet (2; 102), through waste transport piping (3; 3'; 103) and to a waste collection container (5; 5') for storing waste before removal, whereby waste disposal packages each containing one of multiple waste fractions ($F_1$, $F_2$, $F_3$. . . $F_n$) are received through a common waste inlet, wherein:

deposited waste packages containing one fraction ($F_1$, $F_2$, $F_3$. . . $F_n$) are temporarily stored in a temporary storage space (9) above a discharge valve (DV) controlling communication between the waste inlet and the transport piping during a predetermined fraction access time period ($P_{1-n}$) of said fraction in a preset fraction time schedule (TS) belonging to the respective fraction;

at fixed or controlled intervals during said time period, waste packages containing this fraction are conveyed to a waste collection container (5 or 5') in a collection terminal (4) in a stationary type system (1) or in a vacuum truck (4') in a mobile type system (1'), said container being common for all fractions;

and wherein the common container is emptied between each two successive fraction time periods in the time schedule in the stationary type system and after finishing collecting waste from said at least one waste inlet in the mobile type system.

2. The method according to claim 1, comprising providing on the waste disposal packages (6-$F_1$, 6-$F_2$, 6-$F_3$. . . 6-$F_n$) interactive information (7-$F_1$, 7-$F_2$, 7-$F_3$. . . 7-$F_n$) for identifying general or individual user fraction deposit behaviour with regard to waste disposal packages containing the different waste fractions ($F_1$, $F_2$. . . $F_n$).

3. The method according to claim 1, comprising:

reading waste disposal package information (7-$F_1$, 7-$F_2$, 7-$F_3$. . . 7-$F_n$) by means of optical, RFID-type or other appropriate information reading means (8) at the inlets (2; 102), transmitting the gathered information to and processing it in a control unit (10), and controlling blocking and allowing, respectively, access to the waste inlet opening (2A) based on an output from the control unit.

4. The method according to claim 1, comprising automatically releasing a lock (16; 116) of an inlet door (2B; 102B) when the information reading means (8) identifies a waste disposal package (6-$F_1$, 6-$F_2$, 6-$F_3$. . . 6-$F_n$) containing a waste fraction ($F_1$, $F_2$. . . $F_n$) that is allowed access during the time period ($P_{1-n}$) in question.

5. The method according to claim 4, further comprising:

automatically opening the inlet (102) door (102B) subsequent to releasing the locked state of the waste inlet door, maintaining the opened state of the inlet door for a set time (T), automatically closing the inlet door after the set time has passed, and automatically locking the closed inlet door.

6. The method according to claim 1, comprising conveying all deposited waste fractions ($F_1$, $F_2$, $F_3$. . . $F_n$) to a waste container (5) of a central terminal (4) or alternatively to a waste container (5') of a vacuum truck (4').

7. The method according to claim 1, comprising:

providing the waste disposal packages (6-$F_1$, 6-$F_2$, 6-$F_3$. . . 6-$F_n$) with information readable by information reading means (8), whereby the waste disposal packages are received by the common inlet (2; 102) subsequent to identifying each received waste disposal package by comparing read waste fraction information (7-$F_1$, 7-$F_2$, 7-$F_3$. . . 7-$F_n$) provided thereon and being unique for each fraction, with stored waste fraction data, comparing the identified waste disposal packages with the preset fraction time schedule (TS) for matching the waste fraction information of the packages to the predetermined fraction time schedule time periods ($P_{1-n}$), allowing access to an inlet opening (2A) of the waste inlet for each identified package during the predetermined fraction time schedule time periods ($P_{1-n}$)that belong to the respective fraction, and blocking access to the waste inlet for each identified package at all other times.

8. The method according to claim 7, further comprising providing on the waste disposal packages (6-$F_1$, 6-$F_2$, 6-$F_3$. . . 6-$F_n$) interactive information (7-$F_1$, 7-$F_2$, 7-$F_3$. . . 7-$F_n$) for identifying general or individual user fraction deposit behaviour with regard to waste disposal packages containing the different waste fractions ($F_1$, $F_2$. . . $F_n$).

9. The method according to claim 7, further comprising conveying all deposited waste fractions ($F_1$, $F_2$, $F_3$. . . $F_n$) to a waste container (5) of a central terminal (4) or alternatively to a waste container (5') of a vacuum truck (4').

10. The method according to claim 7, further comprising:

reading waste disposal package information (7-$F_1$, 7-$F_2$, 7-$F_3$. . . 7-$F_n$) by means of optical, RFID-type or other appropriate information reading means (8) at the inlets (2; 102), transmitting the gathered information to and processing it in a control unit (10), and controlling blocking and allowing, respectively, access to the waste inlet opening (2A) based on an output from the control unit.

11. The method according to claim 7, further comprising automatically releasing a lock (16; 116) of an inlet door (2B; 102B) when the information reading means (8) identifies a waste disposal package (6-$F_1$, 6-$F_2$, 6-$F_3$. . . 6-$F_n$) containing a waste fraction ($F_1$, $F_2$. . . $F_n$ that is allowed access during the time period ($P_{1-n}$)in question.

12. The method according to claim 7, further comprising setting up an optionally selectable, preset fraction time schedule (TS) allowing access to the waste inlet (2; 102) opening (2A) for the individual waste fractions ($F_1$, $F_2$, $F_3$. . . $F_n$) during specified hours of each day, during specified days of each week or during specified weeks of each month.

13. The method according to claim 12, further comprising conveying all deposited waste fractions ($F_1$, $F_2$, $F_3$. . . $F_n$) to a waste container (5) of a central terminal (4) or alternatively to a waste container (5') of a vacuum truck (4').

14. A system (1, 1') for vacuum operated collecting and managing of waste (W), comprising: at least one waste inlet (2; 102) for receiving waste deposited in waste disposal packages (6-$F_1$, 6-$F_2$, 6-$F_3$. . . 6-$F_n$) and waste transport piping (3; 3'; 103) for conveying the packages from the inlets to a waste collection container (5; 5') for storing waste before removal, said at least one waste inlet being common for disposal packages that each contain only one of multiple waste fractions ($F_1$, $F_2$, $F_3$. . . $F_n$), the system further comprising:

a temporary storage space (9; 109A-B) for temporarily storing deposited waste disposal packages (6-$F_1$, 6-$F_2$, 6-$F_3$. . . 6-$F_n$) and provided above a discharge valve (DV) for controlling communication between the waste inlet (2; 102) and the transport piping (3; 103);

wherein the discharge valve (DV) has closed and open positions for temporarily storing waste packages containing one fraction ($F_1$, $F_2$, $F_3$. . . $F_n$) in the storage space during pre- determined access time periods ($P_{1-n}$) of said fraction in a preset fraction time schedule (TS) and for communicating the waste packages containing this fraction at fixed or controlled intervals during said time periods from the inlet (2; 102) to the transport piping (3; 3', 103); the system comprising:

a stationary vacuum operated waste collection system (1) that communicates with a central waste collection terminal (4) having a waste fraction container (5) common for all fractions; or alternatively a mobile vacuum operated waste collection system (1') that communicates with a vacuum truck (4') having an integrated waste fraction container (5') common to all fractions.

15. The system (1; 1') according to claim 14, wherein the waste disposal packages (6-$F_1$, 6-$F_2$, 6-$F_3$. . . 6-$F_n$) carry readable information by information reading means (8) provided at the inlet/inlets (2; 102) for receiving waste fraction identifying information (7-$F_1$, 7-$F_2$, 7-$F_3$. . . 7-$F_n$) of each disposal package containing one of the multiple waste fractions ($F_1$, $F_2$, $F_3$. . . $F_n$), said identifying information being unique for each of the multiple fractions;

the system further comprising:

means (11) for identifying each waste disposal package to be received by comparing waste fraction information carried thereby and being unique for each fraction, with stored waste fraction data;

means (12) for comparing the identified waste disposal packages with the preset fraction time schedule (TS) for matching the waste fraction information of the packages to pre-determined fraction time schedule time periods ($P_{1-n}$)that belong to the respective fraction; and means (15) for controlling release and activation of an inlet door lock (16; 116 ), allowing access to a waste inlet opening (2A) during the predetermined fraction time schedule time periods ($P_{1-n}$)that belong to the respective fraction and blocking access to the waste inlet for each identified package at all other times.

16. The system (1; 1') according to claim 15, wherein the means for identifying each waste disposal package is an information processing means (11) comprising a digital comparator (11A) for comparing information (7-$F_1$, 7-$F_2$, 7-$F_{3\ldots7\text{-}Fn}$) read from waste disposal packages (6-$F_1$, 6-$F_2$, 6-$F_3$. . . 6-$F_n$) with fraction ($F_1$, $F_2$, $F_3$. . . $F_n$) data stored in a memory (11B) of the processing means, to thereby identify the fraction deposited in the waste disposal packages.

17. The system (1; 1') according to claim 16, wherein the means (13) for comparing the identified waste disposal packages to a preset fraction time schedule (TS) comprise:

a fraction scheduler (12) for setting up the fraction time schedule (TS), a first digital comparator (13A) for matching the identified disposal package fraction ($F_1$, $F_2$, $F_3$. . . $F_n$) with the fraction time schedule time periods ($P_{1-n}$)that belong to the respective fraction, a timer/clock (14) for setting up the present time and a second digital comparator (13B) for comparing the time periods belonging to the identified disposal package fraction with the present time, and an output from said means for comparing the identified waste disposal packages to a preset fraction time schedule controls the means (15) for controlling release and activation of an inlet door lock (16; 116) to thereby allow or block access to the waste inlet (2; 102) opening (2A) for the individual waste fractions.

* * * * *

UNITED STATES PATENT AND TRADEMARK OFFICE

CERTIFICATE OF CORRECTION

PATENT NO. : 8,560,116 B2
APPLICATION NO. : 13/144844
DATED : October 15, 2013
INVENTOR(S) : Christer Ojdemark It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 181 days.

Signed and Sealed this
Fifteenth Day of September, 2015

Michelle K. Lee
*Director of the United States Patent and Trademark Office*